Figure 1:
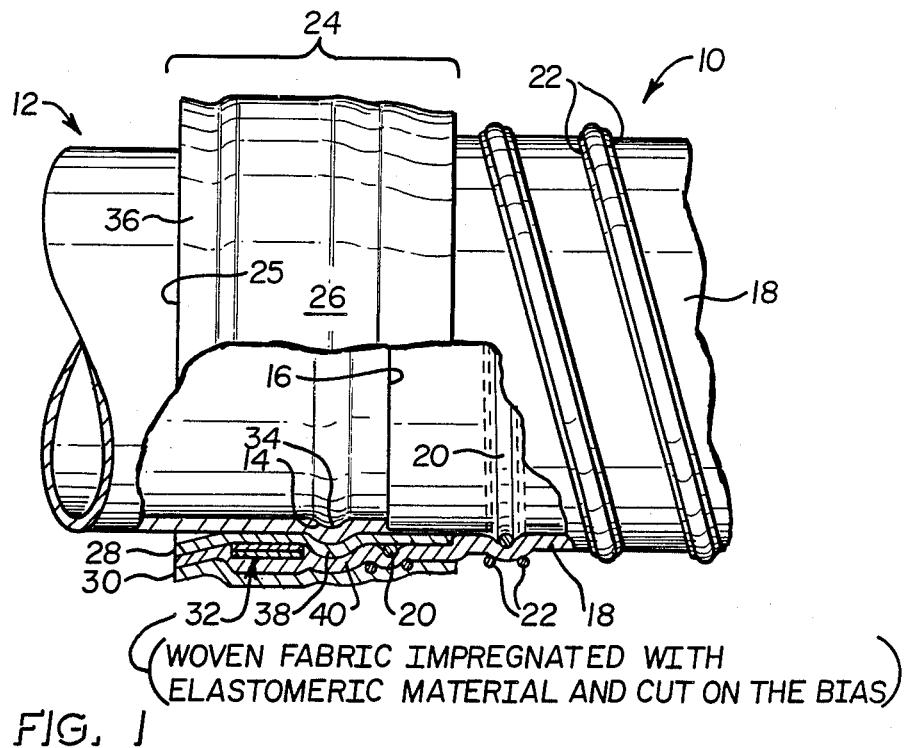

United States Patent

Kogge et al.

[11] Patent Number: 4,768,563
[45] Date of Patent: Sep. 6, 1988

[54] QUICK-DISCONNECT HOSE

[75] Inventors: Fred R. Kogge; Douglas A. DeCamp, both of Hastings, Mich.

[73] Assignee: Flexfab, Inc., Hastings, Mich.

[21] Appl. No.: 114,556

[22] Filed: Oct. 29, 1987

[51] Int. Cl.[4] ............................................. F16L 37/04
[52] U.S. Cl. ................................. 138/109; 138/155; 285/321
[58] Field of Search ............... 138/109, 110, 103, 172, 138/153, 174, 178, 120, 155; 285/321, DIG. 23, DIG. 24

[56] References Cited

U.S. PATENT DOCUMENTS

| | | | |
|---|---|---|---|
| 840,536 | 1/1907 | Weir | 183/109 |
| 1,525,538 | 2/1925 | Evans | 285/321 X |
| 1,970,513 | 8/1934 | Knowland . | |
| 2,683,466 | 7/1954 | Guiles | 138/109 |
| 2,703,109 | 3/1955 | Saville | 138/109 X |
| 2,813,272 | 11/1957 | Hagan . | |
| 2,837,354 | 6/1958 | Thibault et al. . | |
| 2,911,237 | 11/1959 | Olson . | |
| 2,917,102 | 12/1959 | Mahady . | |
| 3,119,415 | 1/1964 | Galloway et al. . | |
| 3,295,557 | 1/1967 | Christiansen . | |
| 3,613,736 | 10/1971 | Kuwabara . | |
| 4,148,342 | 4/1979 | Welsby . | |
| 4,191,217 | 3/1980 | Kadono et al. | 183/109 |

Primary Examiner—James E. Bryant, III
Attorney, Agent, or Firm—Varnum, Riddering, Schmidt & Howlett

[57] ABSTRACT

A quick-disconnect hose adapted to be coupled with a cylindrical male fitting having an outer annular bead. The hose comprises a flexible tubular wall with a female coupling element at an end region of the wall adapted to be received over the male fitting. The coupling element comprises an inner ply lining the wall at the end region, an outer ply girdling the wall at the end region, and hoop structure interposed between the wall at the end region and one of the inner and outer plies. The inner ply is formed with an annular groove adapted to receive the annular bead of a male fitting in coupling relation therewithin. The hoop structure is disposed axially outwardly of the annular groove and resists axial passage of the annular bead of the male fitting to and from the coupling relation within the groove.

11 Claims, 1 Drawing Sheet (WOVEN FABRIC IMPREGNATED WITH ELASTOMERIC MATERIAL AND CUT ON THE BIAS)

QUICK-DISCONNECT HOSE

This invention relates to quick-disconnect hoses, and more particularly, to quck-disconnect hoses for conveying gaseous substances at low pressures. Quick-disconnect hoses in accordance with the invention are especially useful as air ducts in the ventilation and air-conditioning systems of vehicles such as aircraft.

Lightweight hoses of highly flexible construction are widely used in aircraft to interconnect elements of ventilation and air-conditioning systems. These hoses are adapted to be coupled with rigid male fittings of hollow cylindrical construction which are formed with an outer circular boss or annular bead. A widely employed class of such fittings are commonly referred to as "MS fittings" because they are identified by a code which consists of the letters MS (military standard) followed by a number which indicates dimensions. An end region of the hose is formed with an internal annular groove of a configuration and location to receive the annular bead of the male fitting in coupling relation therewithin. Heretofore a circular clamp, or circular spring, usually formed of metal wire, was tightly secured around the hose axially outwardly of the annular bead of the metal fitting to prevent the bead from being dislodged from the annular groove of the hose, thereby to preclude blowoff of the hose or otherwise inadvertent uncoupling of the hose and the metal fitting.

Although a clamp applied in this manner provides a secure coupling, a tool is normally required for applying the clamp, and initial installation of the system is thereby slowed. The use of clamps give rise to another problem, however, as follows.

Many modern transport aircraft, both military and commercial, are so designed that interior spaces may be converted from one use to another and back again with relative ease. Thus, the entire aircraft, or one or more portions of its interior, can be used alternately for passengers and cargo, or interior compartments can be converted back and forth between so-called coach or tourist seating and first-class appointments. In keeping with this flexibility, the ventilation and air-conditioning systems in the convertible spaces are designed to be rearranged to accommodate each particular use of the space. Such rearrangement necessarily means uncoupling and recoupling the hoses used to interconnect elements of the system. In these circumstances, the use of clamps becomes a substantial obstacle to speed and efficiency. The present invention permits the clamp to be omitted and the hoses to be coupled with and uncoupled from MS fittings with much greater speed and ease. It should be apparent that the expression "quick-disconnect hose" is an abbreviated designation, the hose according to the invention being a "quick-connect hose" as well.

In order to provide the quick-connect/quick-disconnect advantages of the invention and yet maintain a secure coupling, the present hose is provided with a multi-ply female coupling element adapted to be received over the male fitting. Multi-ply coupling elements are not novel in themselves. An example of a prior multi-ply hose coupling structure is disclosed in U.S. Pat. No. 4,148,342, issued Apr. 10, 1979, to J. A. Welsby. This prior structure is shown as interconnecting two rigid male hose fittings having bores of different sizes. Being intended for hard usage and great stresses, the prior structure is formed with a number of plies, all of which extend continuously from end to end of the structure, the innermost ply being formed with annular grooves to receive complementary annular ribs or beads provided on the male fittings. The disclosure contemplates use with hoses of large internal diameter, specifically bores of 10 to 30 inches.

In accordance with the present invention, there is provided a quick-disconnect hose which comprises a flexible tubular wall, a female coupling element being provided at an end region of the wall. The female coupling element is adapted to be received over a cylindrical male fitting which is formed with an outer annular bead. The coupling element comprises an inner ply which lines the wall at the end region and is formed with an annular groove adapted to receive the bead of the male fitting in coupling relation therewithin. An outer ply girdles the wall at the end region. Hoop means are interposed between the wall and one of the outer and inner plies and are disposed axially outwardly of the annular groove. The inner and outer plies and the hoop means are formed of elastomeric material, the hoop means being adapted to resiliently resist radial expansion, whereby to resist axial passage of the bead of the male fitting to and from its coupling relation within the annular groove of the inner ply.

Preferably, the hoop means snugly encircles the inner ply and comprises at least two concentric bands, each of the bands being formed of woven fabric impregnated with elastomeric material and cut on the bias.

Figure 2:
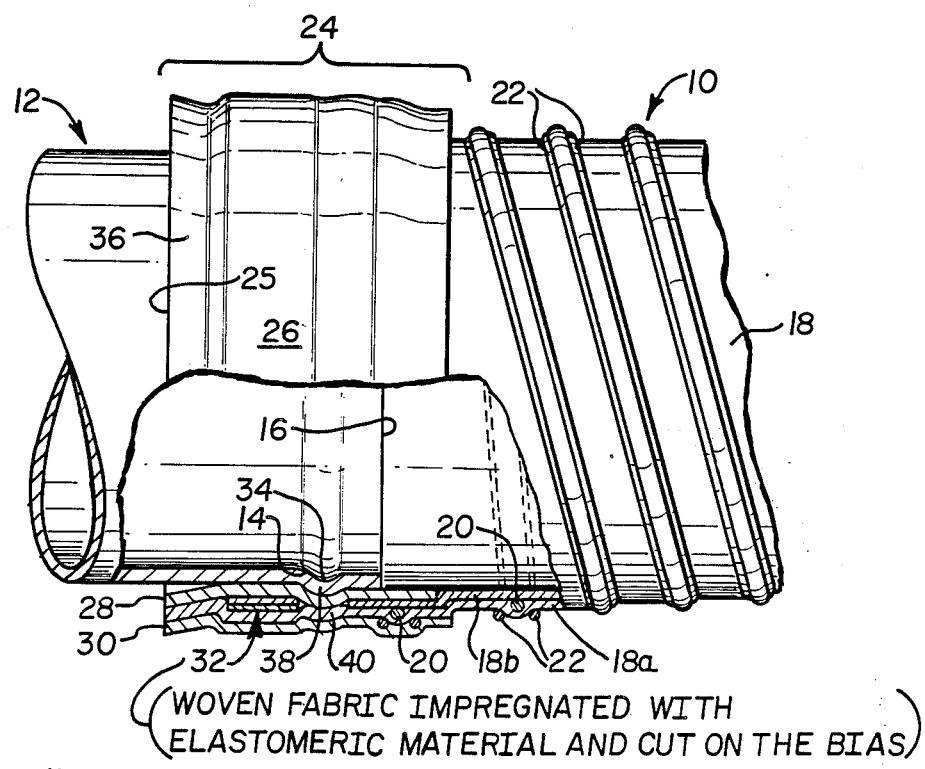

Other features, advantages and objects of the invention will be apparent from the ensuing description taken in conjunction with the accompanying drawings, in which:

FIG. 1 is a fragmentary view from the side, partially in longitudinal section, of a quick-disconnect hose representing one embodiment of the invention and shown in coupling relation with a male fitting; and FIG. 2 is a similar view of a male fitting and a quick-disconnect hose which represents an alternative embodiment of the invention.

Referring now in detail to the drawings, and particularly to FIG. 1, there is shown a quick-disconnect hose 10 constructed in accordance with the present invention and coupled with a male fitting 12 which forms no part of the invention. The male fitting is formed of aluminum or another rigid material in hollow, cylindrical configuration. A circular boss or outer annular bead 14 is formed near an axially outer end 16 of the fitting.

Hose 10 comprises a flexible tubular wall 18 which, in the embodiment of FIG. 1, is formed of a single ply throughout the major portion of its length. To resist pinching or kinking of wall 18, it may be reinforced by an internal, helically wound wire 20, preferably consisting of a nonmetallic substance such as nylon. The wire is flanked on either side by double cords 22 which are laid externally of the wall and which are also preferably formed of a nonmetallic material such as fiberglass.

The helically wound wire and cords terminate in an end region 24 of wall 18, well short of the corresponding end 25 of hose 10. As an alternative to the helically wound wire 20 and cords 22, wall 18 may be accordian-pleated except in end region 24; that is, it may be formed with a continuous series of annular corrugations.

Provided at end region 24 is a female coupling element 26 adapted to be received over fitting 12. The coupling element comprises an inner ply 28 lining wall 18 at the end region, an outer ply 30 girdling the wall at the end region, and hoop means 32 described with greater particularity hereinafter.

Inner ply 28 preferably comprises homogeneous elastomeric material and is formed with an annular groove 34 adapted to receive the annular bead 14 of fitting 12 in coupling relation therewithin, as shown.

Like wall 18, outer ply 30 is preferably formed of woven fabric impregnated with elastomeric material. Thus, one effect of the outer ply, an effect augmented to some extent by the presence of inner ply 28, is to enhance the column strength of the hose at the end region 24; that is, it increases stiffness in the axial direction to resist buckling of coupling element 26 and any tendency of hose end 25 to turn under when the hose is coupled with a male fitting. In addition, coupling element 26 is outwardly flared at its axially outer end portion 36 to facilitate reception of the male fitting upon coupling.

While hoop means 32 might with good effect be interposed between wall 18 and outer ply 32, it is preferably interposed between the wall and inner ply 28, snugly encircling the latter, as shown. It will be noted that inner ply 28 and wall 18 are radially outwardly displaced at corresponding annular portions 38 and 40, respectively, to form annular groove 34, hoop means 32 preferably being disposed adjacent and axially outwardly of these displaced annular portions.

In preferred embodiments of the invention, the hoop means comprises at least two concentric, coterminous bands, each of the bands being formed of woven fabric impregnated with elastomeric material and cut on the bias for optimum elasticity, whereby to resiliently resist radial expansion. Thus, in the disposition shown and described, the hoop means acts to resist axial passage of annular bead 12 to and from its coupling relation within annular groove 34 of inner ply 28.

The embodiment of the invention depicted in FIG. 2 is identical with that shown in FIG. 1 except that tubular wall 18 comprises two plies, namely an external ply 18a and an internal ply 18b, the latter terminating in end region 24 at a location adjacent to and axially inwardly of displaced annular portions 38 and 40. The external ply, on the other hand, is continuous throughout the end region and the full length of the hose, whereby inner ply 28 of coupling element 26 spans the axially outer end portions of both the internal ply and the external ply of the wall. It will be recognized that wall 18 of the hose may be made up of any number of plies and remain within the purview of the invention.

The preferred method of manufacture begins with a mandrel (not shown) duplicating the cylindrical configuration of male fitting 12, but extending throughout the length of the hose, and formed with an annular rib of precisely the configuration and dimensions of annular bead 14 of the male fitting and so located as to form annular groove 34 in inner ply 28. It should be noted that the end region (not shown) of hose 10 opposite end region 24 may be formed with a female coupling element as well, and the mandrel employed will be configured accordingly.

Inner ply 28 is cut from an uncured sheet of homogeneous elastomeric material. All other plies, including those which make up wall 18, are cut from sheets consisting of woven fabric impregnated with uncured elastomeric material. The latter is preferably a silicone rubber in each case, whereas the fabric is preferably woven from glass fiber.

The various plies, wires and cords are laid about the mandrel in succession from innermost to outermost, as will be obvious from the drawings. When the last of these, namely outer ply 30, has been so laid, the entire structure is tightly wrapped with nylon tape. It is then placed in an oven to cure at 350° F. for 10 to 30 minutes, whereupon the mandrel and nylon tape are removed and the hose is post-cured in the oven at 350° F. for 45 minutes to 4 hours to be sure any remaining volatiles and catalysts are no longer present in the material.

The internal diameter of a hose so constructed will be in the range of 0.5 inches to 3.5 inches, though optimum performance appears to be achieved with internal diameters at or above 1.25 inches. Similarly, hose lengths of 240.0 inches or less are preferred.

Materials may be selected to provide acceptable performance in temperatures of −65° F. to 300° F. If the hose is to be used in ventilation or air-conditioning systems, it should not blow off the male fitting at static pressures below 10 inches of water.

While the invention has been described in connection with specific embodiments thereof, it will be understood that this is by way of illustration and not of limitation, and that the scope of the appended claims should be construed as broadly as the prior art will permit.

What is claimed is:

1. A quick-disconnect hose adapted to be coupled with a cylindrical male fitting having an outer annular bead, the hose comprising a flexible tubular wall, a female coupling element at an end region of the wall adapted to be received over the male fitting, the coupling element comprising an inner ply lining the wall at the end region and formed with an annular groove adapted to receive the annular bead of a male fitting in coupling relation therewithin, an outer ply girdling the wall at the end region, and hoop means interposed between the wall at the end region and one of the inner and outer plies and disposed axially outwardly of the annular groove, the inner and outer plies and the hoop means comprising elastomeric material, the hoop means being adapted to resiliently resist radial expansion thereof, whereby to resist axial passage of the annular bead of a male fitting to and from said coupling relation within the annular groove.

2. A quick-disconnect hose according to claim 1, wherein the inner ply and the wall are radially outwardly displaced at corresponding annular portions thereof to form the annular groove in the inner ply, the hoop means being disposed adjacent to and axially outwardly of the displaced annular portions.

3. A quick-disconnect hose according to claim 1, wherein the inner ply comprises substantially homogeneous elastomeric material, and each of the inner and outer plies and the wall comprises woven fabric impregnated with elastomeric material.

4. A quick-disconnect hose according to claim 1, wherein the wall comprises a plurality of plies.

5. A quick-disconnect hose according to claim 4, wherein each of the plurality of plies of the wall comprises woven fabric impregnated with elastomeric material.

6. A quick-disconnect hose according to claim 2, wherein the tubular wall comprises an external ply and an internal ply, the internal ply terminating in the end region at a location adjacent to and axially inwardly of the displaced annular portions, the external ply being continuous throughout the end region, whereby the inner ply of the coupling element spans the axially outer end portions of the internal ply and external ply of the wall.

7. A quick-disconnect hose according to claim 1, wherein the hoop means is interposed between the inner ply and the wall.

8. A quick-disconnect hose according to claim 1, wherein the hoop means comprises an inner band encircling the inner ply, and an outer band axially coterminous with the inner band and interposed between the inner band and the tubular wall.

9. A quick-disconnect hose according to claim 8, wherein each of the inner and outer bands comprises a woven fabric impregnated with elastomeric material and cut on the bias.

10. A quick-disconnect hose according to claim 1, wherein the axially outer end portion of the female coupling element is outwardly flared to facilitate reception of a male coupling member.

11. A quick-disconnect hose adapted to be coupled with a cylindrical male fitting having an outer annular bead, the hose being formed of elastomeric material and comprising a flexible tubular wall, a female coupling element at an end region of the wall adapted to be received over the male fitting, the coupling element comprising an inner ply lining the wall at the end region, the inner ply and the wall being radially displaced at corresponding annular portions thereof to form an annular groove in the inner ply adapted to receive the annular bead of a male fitting in coupling relation within the groove, an outer ply girdling the wall at the end region, and hoop means interposed between the inner ply and the wall at the end region and disposed adjacent to and axially outwardly of the displaced annular portions, the hoop means tightly encircling the inner ply and comprising at least two concentric bands, each of the bands being formed of woven fabric impregnated with elastomeric material and cut on the bias, whereby to resiliently resist axial passage of the annular bead of a male fitting to and from said coupling relation within the annular groove.

* * * * *